United States Patent
Goldsmith et al.

(10) Patent No.: US 6,925,308 B2
(45) Date of Patent: Aug. 2, 2005

(54) AUTO-FILL MESSAGE FIELDS IN A COMMUNICATION TERMINAL

(75) Inventors: Katrina Goldsmith, Cardiff, CA (US); Sapna Mehta, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 159 days.

(21) Appl. No.: 10/074,140

(22) Filed: Feb. 11, 2002

(65) Prior Publication Data

US 2003/0153362 A1 Aug. 14, 2003

(51) Int. Cl.$^7$ .................. H04Q 7/20; H04B 1/38; H04M 11/10
(52) U.S. Cl. .............. 455/466; 455/566; 455/412.1
(58) Field of Search ................. 455/566, 550, 455/575, 412, 418, 419, 420, 427, 414.1, 466, 412.1, 412.2; 370/316, 328, 333; 340/7.21, 7.23, 7.55, 7.52, 7.51, 7.53; 709/206

(56) References Cited

U.S. PATENT DOCUMENTS

| | | | | |
|---|---|---|---|---|
| 3,714,650 A | * | 1/1973 | Fuller et al. | 342/42 |
| 5,142,279 A | * | 8/1992 | Jasinski et al. | 340/7.22 |
| 5,630,207 A | * | 5/1997 | Gitlin et al. | 340/7.23 |
| 5,678,191 A | * | 10/1997 | Eaton et al. | 340/7.22 |
| 5,896,566 A | * | 4/1999 | Averbuch et al. | 455/419 |
| 6,026,292 A | * | 2/2000 | Coppinger et al. | 455/406 |
| 6,157,630 A | * | 12/2000 | Adler et al. | 370/338 |
| 6,169,911 B1 | * | 1/2001 | Wagner et al. | 455/566 |
| 6,292,473 B1 | * | 9/2001 | Duske et al. | 370/316 |

\* cited by examiner

*Primary Examiner*—Quochien B. Vuong
(74) *Attorney, Agent, or Firm*—Philip R. Wadsworth; Charles D. Brown; Thomas M. Thibault

(57) ABSTRACT

A method and apparatus for automatically entering information into formatted messages. A communication terminal comprises a receiver for receiving a formatted message, the formatted message comprising a message identification code and a plurality of information fields. A memory contains field-mapping information corresponding to various message identification codes, the field-mapping information indicating which fields of a particular formatted message are to be copied into information fields of a response message to the formatted message. When a response to the formatted message is desired, a processor determines which formatted message to respond to and its corresponding message identification code. A response message is then created, comprising at least one information field, wherein information from one or more of the information fields from the formatted message is copied into the at least one information field of the response message based on the field-mapping information identified by the message identification code.

15 Claims, 4 Drawing Sheets

AUTO-FILL MESSAGE FIELDS IN A COMMUNICATION TERMINAL

BACKGROUND

I. Field of the Invention

The present invention pertains generally to text-based communications, and more specifically to providing a method and apparatus for automatically entering information into pre-formatted messages in a communication terminal.

II. Description of the Related Art

Mobile communications play an important part in many businesses today. Typically, such communications allow voice, text, and/or data to be wirelessly transmitted to remote destinations pertinent to the particular business. For example, in the transportation industry, trucking companies have used satellite communications for many years in order to track and communicate with their respective trucks. Satellite communications provide ubiquitous coverage so that vehicles in even remote areas of the world can communicate with their respective dispatch centers. One drawback of satellite communication systems, however, is that it is often expensive compared to other types of wireless communications, such as cellular telephones, for example.

In a text-based messaging system, the cost of satellite communications may be reduced by decreasing the length of messages, thereby reducing the amount of information transmitted. One method for reducing message lengths is to use predefined messages, also known as formatted messages or "macro" messages. In such a method, text messages are assigned a message identification code which identify each message as conforming to a predefined format. For example, a first message may be defined, having a message identification code of "1", comprising a first information field indicating a destination for picking up a shipment and a second information field indicating the expected date and time of the pickup. This message may be transmitted, for example, from a central dispatch station to a truck owned by a business entity associated with the dispatch station. A definition of this message is stored in a memory within a mobile communication terminal located on the truck.

When this message is transmitted by the dispatch station, only the message identification number, the pickup destination, and the expected date and time of arrival are transmitted, generally separated from each other by some predefined information sequence. When the message is received by the truck, the mobile communication terminal determines that a message having a message identification number of "1" has been received. Then, the predefined definition of formatted message "1" is used to "decode" the message. For example, the predefined definition for messages having a message identification code of "1", in this example, indicates that the first information field represents a destination and that the second information field represents a date and time. Consequently, this message may be presented to a vehicle operator in using an output device, such as a computer monitor, Cathode Ray Tube (CRT), plasma display, etc.

The vehicle operator may respond to the message at a subsequent time. For example, in the present example, the vehicle operator may respond to the message when the vehicle has arrived at the destination in order to alert the dispatch center of the vehicle arrival. As such, the vehicle operator typically requests that a response message be transmitted, the response message comprising a message identification code and one or more information fields. In the present example, the vehicle operator might select the received message as a message to respond to and in response to the selection, a response message is generated and displayed to the vehicle operator. The response message generally comprises a number of information fields, such as a field for indicating the intended recipient of the response message, a field for indicating who the response message is from, a field indicating the present location of the vehicle, and a bill-of-lading number or some other number which references the goods to be picked up at the given destination.

The vehicle operator uses an input device such as a keyboard or a touchscreen, so enter information into the various fields of the response message, including recipient, vehicle or vehicle operator identification, vehicle location, and bill-of-lading number. Frequently, information from the message must be entered into the response message, requiring the vehicle operator to remember the information, and then to type it correctly into the response message. The response message is then transmitted to the dispatch center.

One problem with the present method of sending a response message is that frequently, information is entered incorrectly into one or more of the various information fields. This may result in additional messaging costs as the dispatch center may need to query the vehicle operator for the correct information. In addition, manually entering information into response messages is often a slow process, delaying the vehicle operator from transporting the goods as quickly as possible.

What is needed is a method and apparatus for allowing information to be entered quickly into such response messages to minimize the chances of error and to reduce the vehicle operator's time spent sending response messages.

SUMMARY

The present invention is directed to a method and apparatus for automatically entering information into formatted messages in a communication terminal. In one embodiment, the invention is directed to a communication terminal, comprising a receiver for receiving a formatted message, the formatted message comprising a message identification code and a plurality of information fields. The communication terminal further comprises an output device for presenting the formatted message and an input device for responding to the formatted message. The formatted message is stored in a memory, the memory also for storing field-mapping information corresponding to each message identification code, that indicates which information fields from the formatted message to copy into a response message. The communication terminal further comprises a processor for creating the response message in response to an indication from the input device of a request to respond to the formatted message, the response message comprising at least one information field, wherein information from one or more of the information fields from the formatted message is copied into one or more information fields of the response message based on the field-mapping information corresponding to the message identification code of the formatted message. Finally, the communication terminal comprises a transmitter for transmitting the response message.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 4b illustrates one embodiment of a response message corresponding to one of the sub-messages of the formatted message of FIG. 4a.

DETAILED DESCRIPTION

The method and apparatus for automatically entering information into formatted messages in a communication terminal is best illustrated in the context of a satellite-based mobile communication system used in the trucking industry. It should be understood, however, that the present invention may be used in any application where formatted messages are used. For example, the method and apparatus for automatically entering information into formatted messages could be used by a software application running on a desktop or laptop computer, or in virtually any kind of business where text messages are used to communicate with fixed or mobile communication devices. In addition, the method and apparatus for automatically entering information into formatted messages can be used regardless of the type of communication system used, such as cellular, landline, satellite, radio, data, or optical communication systems.

Figure 1:
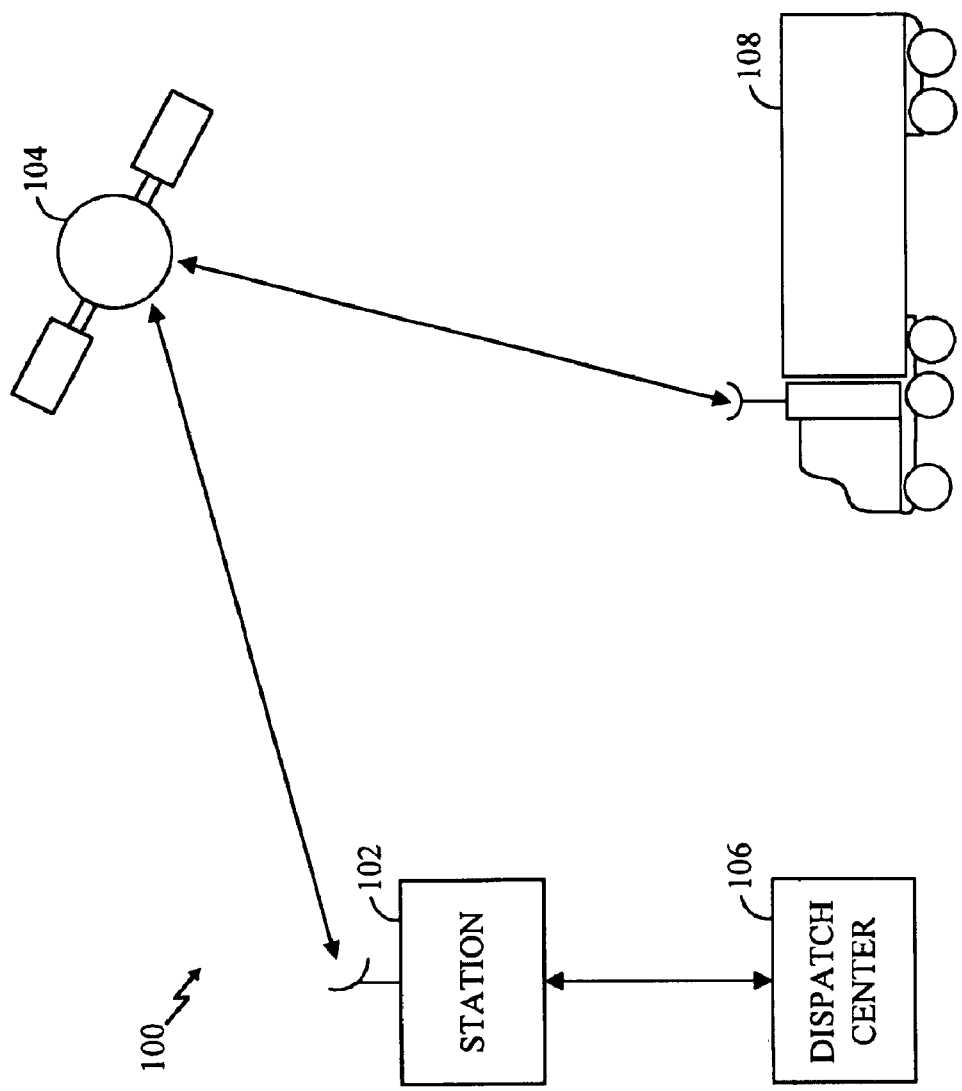
FIG. 1 illustrates a communication system in which the method and apparatus for automatically entering information into formatted messages is used.

FIG. 1 illustrates a communication system 100 in which the method and apparatus for automatically entering information into formatted messages is used. Dispatch center 106 and vehicle 108 are capable of communication with each other via central station 102 and satellite 104. Of course, the present invention is not limited to a satellite communication system, however. Any wireless terrestrial communication system may be used as well, including, but not limited to, Land Mobile Radio (LMR), short wave, cellular, or PCS systems. In addition, although only a single dispatch center 106 is depicted in FIG. 1, in actuality a plurality of independent dispatch centers are employed throughout the system and may communicate with their respective fleet vehicles via central station 102 and data satellite 104.

In one embodiment, vehicle 108 is a commercial trucking vehicle having a mobile communications terminal (MCT) mounted in a tractor or cab of the vehicle, not shown. The MCT is capable of respectively transmitting and receiving communication signals to and from central station 102 via data satellite 104. Again, it should be understood that the MCT comprises any device capable of communicating with central station 102 using the pre-established communication method of choice.

Information transmitted between the MCT and central station 102 is accomplished using formatted messages, otherwise known as "macro" messages, or pre-formatted messages. Formatted messages are useful because they minimize the amount of information being transmitted, thus reducing communication costs. Cost savings are achieved by transmitting only pertinent data, without sending "overhead" information. An example of a formatted message is shown in FIG. 2.

Figure 2:
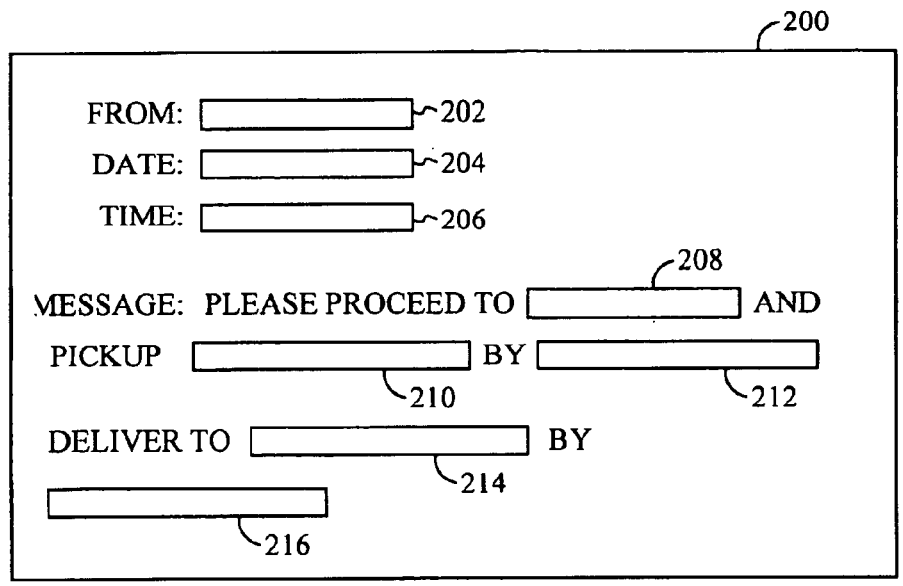
FIG. 2 illustrates one embodiment of a formatted message which instructs a vehicle to pick up goods at one location and deliver the goods to a second location.

FIG. 2 illustrates one embodiment of a formatted message 200 which instructs vehicle 108 to pick up goods at one location and deliver the goods to a second location within given time constraints. Such a message is typically known in the transportation industry as a "load assignment" message. It should be understood that format and presentation of the information contained within formatted message 200 is for illustrative purposes only. Other load assignment messages can be used in the alternative, having a virtually unlimited number of ways to represent the load assignment data.

Formatted message 200 comprises information fields 202 through 216. When a formatted message is transmitted, only the information contained in the information fields, plus some overhead information, is transmitted. The other information in the formatted message 200 is not transmitted, for example, the words "From:", "Date:", "Time:", "Message: Please proceed to", "and pick up", "by", ".", "Deliver to", "by", and ".". When formatted message 200 is created at, for example, central station 102, an operator first chooses which formatted message to send to vehicle 108 from the total number of formatted messages which are already defined. In this example, the operator chooses to send a load assignment message, which has been predefined as having a message identification code of "1". After choosing formatted message 200, the operator then enters information into the information fields 202 through 216. For example, the current date and time that the operator enters the information could be entered by the operator. In another embodiment, this information could be entered automatically by a computer operating in conjunction with central station 102. The operator would then enter a description of where to pick up goods in information field 208, an identification of goods to be picked up in information field 210, and the expected date and time of pick up in information field 212. The operator would then continue to enter information into the remaining information fields as required. Again, in another embodiment, much of the information entered into the information fields could be done automatically by one or more computers and/or software programs operating in conjunction with communications to and from vehicle 108, such as any number of automated dispatch software programs commercially available and in widespread use today.

As mentioned briefly already, in general, a plurality of formatted messages are defined in order to transmit information between central station 102 and various fleet-owned vehicles 108. For example, a variety of formatted messages can be defined which allow vehicle 108 to transmit status and operational information to central station 102, including but not limited to message acknowledgements, vehicle location, speed, and direction, engine characteristics, arrival and departure notifications, and so on. Other formatted messages may be defined to allow central station 102 to send instructions and acknowledgments to vehicle 108. Each of these predefined, formatted messages are assigned a unique message identification code for identifying the type of formatted message. For example, formatted message 200 could be given a message identification code of "1", while another formatted message instructing vehicle 108 to report its present location could be given a message identification code of "2".

The message identification code is used by central station 102 and vehicle 108 to determine which type of formatted message is being received so that it can be "decoded" correctly. For example, when a formatted message having a message identification code of "1" is transmitted to vehicle 108, only the message identification code and the information fields are sent. This information is received by a processor onboard vehicle 108 that determines that it is a load assignment message based on the message identification code, and that the received information is in a format in accordance with a predefined "template" stored locally to vehicle 108 (or central station 102, as the case may be). The template comprises information relating to overhead information that is not transmitted, i.e., the words "Message: Please proceed to" and other non-fielded information which comprises a formatted message. The template also contains information relating to each information field. For example, a received message having a message identification code of "1" is defined as a message having 8 information fields 202 through 216, and, in one embodiment, a definition of how much information is contained in each field, for example, the number of bits or characters which represent each information field. In another embodiment, the template does not define how much information is contained within each information field.

Using the template information, the received information can then be used to reconstruct the original formatted message and presented to a user at either vehicle 108 or at central station 102.

Figure 3:
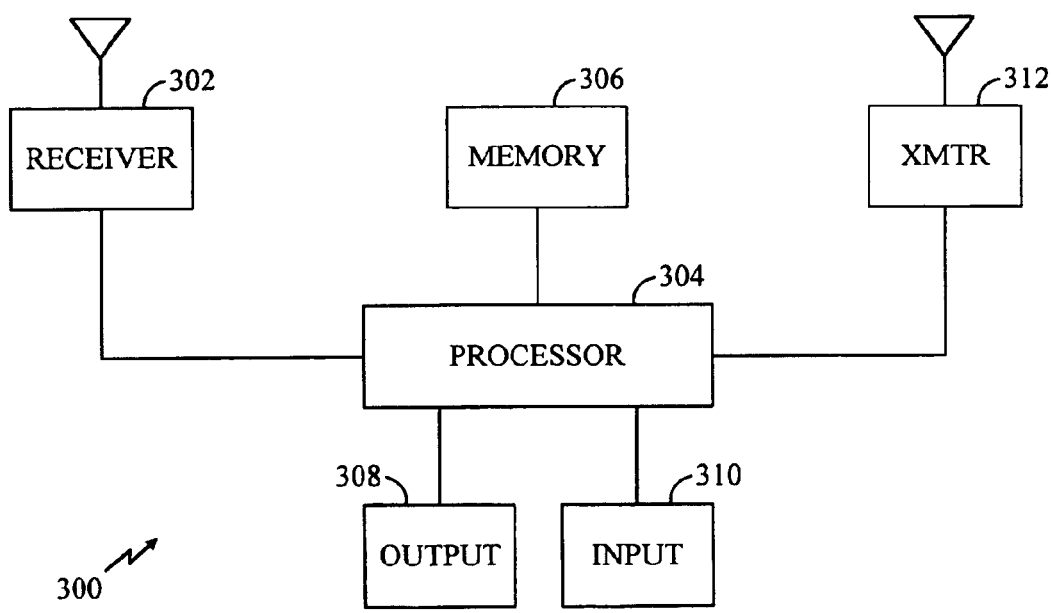
FIG. 3 illustrates a functional block diagram of a communication terminal used to transmit and receive information relating to formatted messages.

FIG. 3 illustrates a functional block diagram of communication terminal 300 used to transmit and receive information relating to formatted messages. It should be understood that the functional blocks shown in FIG. 3 could be used onboard vehicle 108 or they could be used at central station 102. Furthermore, it should be understood that other functional components of communication terminal are not shown in FIG. 3 for purposes of clarity.

Communication terminal 300 comprises receiver 302 for receiving information relating to formatted messages. In one embodiment, receiver 302 comprises well-known RF circuitry for receiving wireless transmissions. In another embodiment, receiver 302 comprises a data modem for use in converting DTMF tones from a Public Switched Telephone Network (PSTN) into digital signals for use with processor 304. In yet another embodiment, receiver 302 comprises a data modem for use in receiving formatted messages from a data network, such as the Internet. In any case, information relating to formatted messages are received by receiver 302 and converted into digital signals for use by processor 304.

The received information, comprising a message identification code and one or more information fields, is provided to processor 304, where it is decoded for presentation to a user of communication terminal 300. In another embodiment, the received information is also stored in memory 306. Processor 304 determines the message identification code of the received information and uses a predefined template stored in memory 306 corresponding to the message identification code to reconstruct the formatted message, using information stored in memory 306 and the information fields of the received information. The reconstructed message may then be stored within memory 306 as a formatted message and/or presented to the user via output device 308.

Processor 304 comprises one or more digital signal processors widely available and known to those skilled in the art. In one embodiment, processor 304 comprises an 80386 microprocessor from Intel Incorporated of Santa Clara, Calif. In other embodiments, processor 304 comprises an Application Specific Integrated Circuit (ASIC), discreet electronic components, a micro-computer, a dedicated state machine, or any other circuitry that allows the functions described as being performed by processor 304.

In one embodiment, memory 306 comprises one or more random access memories (RAM) capable of storing executable programming instructions for processor 304, field-mapping information, templates, and other information necessary for communication terminal 300 to carry out its intended functions. In other embodiments, memory 306 comprises a static RAM, a flash memory, a hard drive, a tape drive, or other electronic memory device well known in the art. It should be further understood that memory 306 could comprise of a combination of the aforementioned memory devices.

In one embodiment, output device 308 comprises a display device, such as a computer screen or monitor. In other embodiments, output device comprises a speaker for generating audible signals representative of formatted messages, a printer, or a combination of the aforementioned.

After a formatted message has been presented to the user, the user may respond to the formatted message by using input device 310, typically a keypad, keyboard, or touch-screen device, although other embodiments contemplate a microphone and electronic circuitry to covert a user's speech to electronic signals. The user indicates which formatted message to respond to in one of several ways. If a received formatted message is currently being displayed to the user, generally input device 310 will allow the user to respond to the currently displayed formatted message, usually by pressing a single key indicating a desire to respond to the message. Another way in which the user can respond to a received formatted message is to view other formatted messages which have been received by communication terminal 300 and stored within memory 306. Once the desired message has been found, the user can indicate that he or she wishes to respond to the message using input device 310.

Once the response request is received by processor 304, a response message is generated and presented to the user via output device 308. The response message is in the form of a formatted message, comprising a message identification code, one or more information fields, and usually some accompanying text, similar to the example shown in FIG. 2. Typically, a number of response messages are defined for a particular fleet of vehicles, and many of the response messages are used to respond to formatted messages that are received by vehicle 108. Memory 306 stores the response messages, having blank information fields, the response messages being predefined by a remote entity, such as fleet management.

When processor receives an indication that a response message is desired, the proper response message is identified in memory 306 and at least one of the response message information fields are filled in using information contained in the received formatted message to which the user is responding. The user may enter additional information into remaining blank information fields, or the response message can be sent without further input from the user.

When the user is ready to send the response message, an indication of such is entered into input device 310. Processor 304 then takes the necessary steps to create a modified response message comprising a message identification code corresponding to the type of message being transmitted, as well as the information contained within the information fields. The modified response message is then provided to transmitter 312, where it is modulated in accordance with the chosen communication type.

Figure 4A:
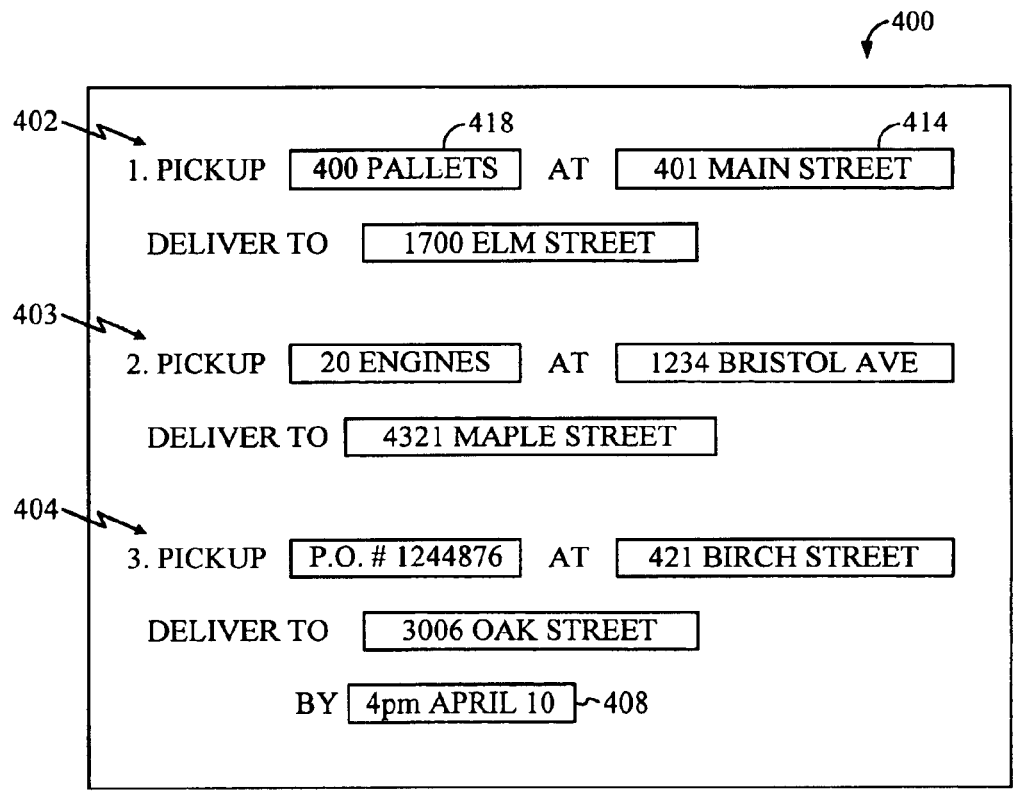
FIG. 4a illustrates one embodiment of a formatted message having sub-messages.

In another embodiment, a formatted message may take the form as shown by formatted message 400 in FIG. 4a, the formatted message having repeating groups of information fields. Such a formatted message is useful, for example, for informing a vehicle operator of a list of destinations to pick up and deliver goods. In this embodiment, formatted message 400 comprises sub-messages 402, 404, and 406. Sub-messages 402 and 404 contain identical information fields while sub-message 406 comprises an additional information field 408. Formatted message is transmitted by central station 102 to vehicle 108 like any other formatted message and may be presented to a vehicle occupant. When the vehicle occupant wishes to respond to such a formatted message, the vehicle occupant may select which of the sub-messages to respond to, rather than responding to the entire formatted message.

For example, if a vehicle operator received formatted message 400, and had proceeded to the first destination of formatted message 400, a response to sub-message 402 may be generated by the vehicle operator selecting sub-message 402 for a response. Input device 310 may be used to select the sub-message, generally by highlighting the sub-message, or any part thereof, by a display screen cursor, and pressing a predetermined key or keys respond to the sub-message. When the request to send a response to sub-message 402 is received by processor 304, an indication of which sub-message has been selected is contained within the request. Processor 304 then accesses memory 306 to generate a response message corresponding to the type of sub-message response requested. Field-mapping information stored within memory 304 details which information fields from the sub-message is copied into information fields of the response message, as shown in FIG. 4*b*, which illustrates response message 410.

Figure 4B:
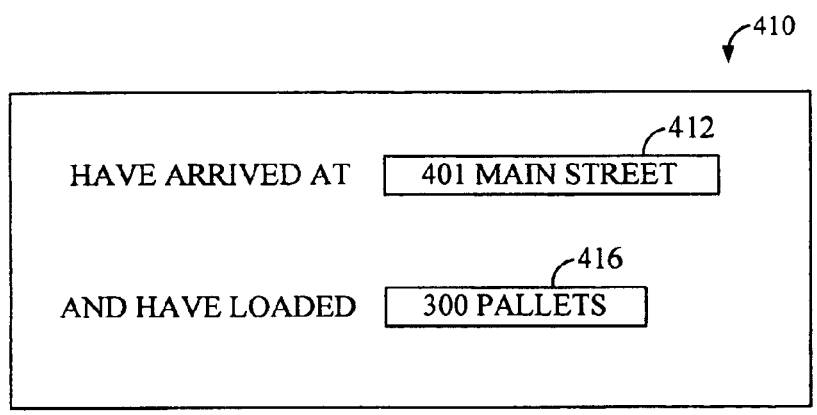

As shown in FIG. 4*b*, response message 410 comprises two information fields, information fields 412 and 416. Information field 412 comprises information copied from information field 414 of formatted message 400, while information field 416 comprises information copied from information field 418 of formatted message 400. In this example, the vehicle operator has altered the information contained within information field 416 to reflect that only 300 pallets had been picked up, rather than the 400 pallets that were identified in information field 418. In another embodiment, information fields in response messages are not alterable. The field-mapping information stored in memory 306 comprises information as to which fields may be altered.

Figure 5:
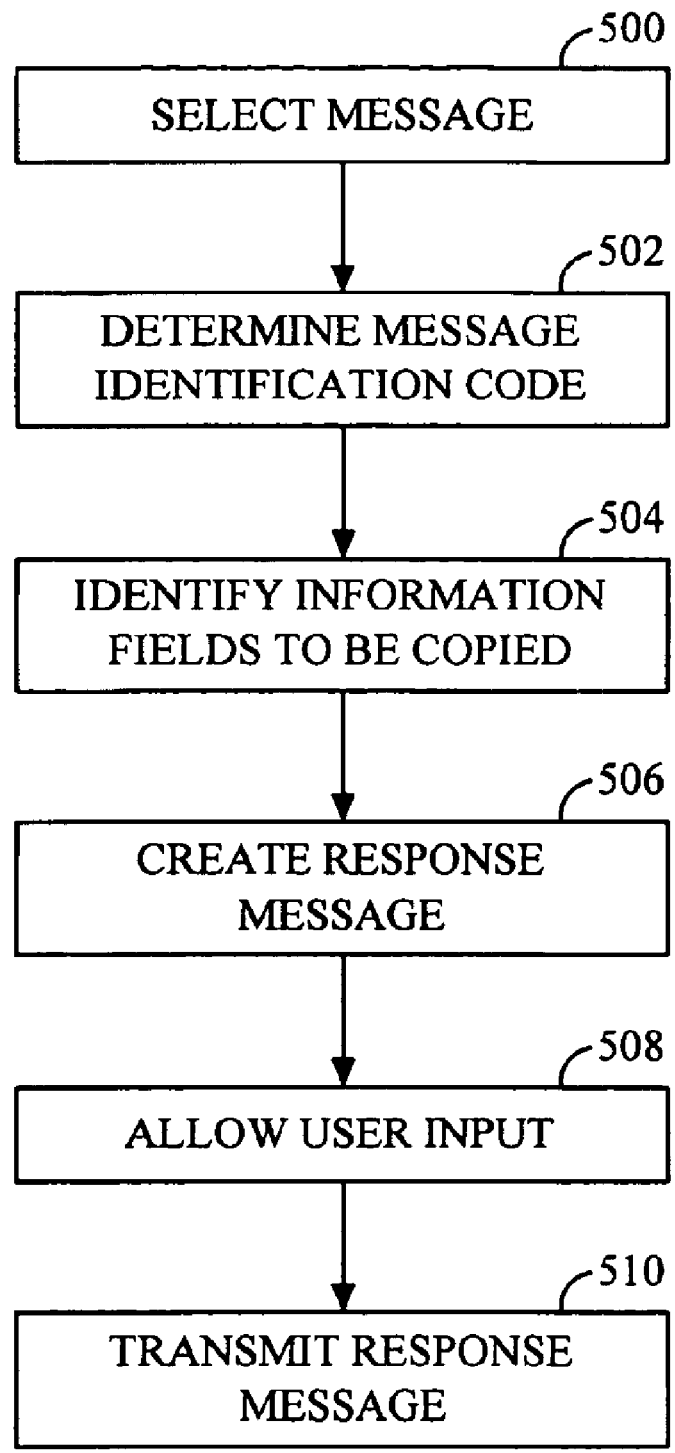
FIG. 5 illustrates a flow diagram of one embodiment of a method for automatically entering information into formatted messages in a communication terminal.

FIG. 5 illustrates a flow diagram of one embodiment of a method for automatically entering information into formatted messages in a communication terminal. In step 500, a formatted message is selected to respond to. The formatted message comprises a message identification code and a number of information fields, the information fields filled in by a sender of the formatted message. The message may be chosen as a message which is currently-displayed by output device 308, or it may be selected from a number of messages stored within a memory of the communication terminal.

In any case, a request to respond to the selected message is entered using input device 310. Processor 304 receives the user's request to respond to the selected formatted message. The request indicates which formatted message the user wishes to respond, either explicitly with an indication of which formatted message to respond, or implicitly by processor 304 knowing which formatted message the user is viewing when the response request is entered.

Processor 304 then determines the message identification code of the formatted message to which a response is desired, as shown in step 502. The message identification code is either provided explicitly along with the request to respond, or it is determined by processor 304 identifying the selected formatted message and determining the message identification code by accessing memory 306. Memory 306 contains information linking each received formatted message with a corresponding message identification code.

In step 504, processor 304 identifies information fields from the formatted message to be copied into the response message using field-mapping information stored in memory 306. The field-mapping information comprises a number of stored message identification codes and corresponding field identification information for each stored identification code. The field identification information identifies which information fields from each type of formatted message is copied into information fields of corresponding response messages. The field-mapping information may be configurable by a remote entity, such as a fleet management. In this case, fleet management defines the relationship between formatted messages and response messages, i.e., which information fields are copied from formatted messages to response messages. The field-mapping information is generally altered at dispatch center 110, then provided to central station 102 via a data link, such as the Internet, telephone lines, dedicated lines, and so on. Central station 102 then stores the new field-mapping information locally, then transmits is to one or more vehicles 108 owned by fleet management. When a vehicle 108 receives the new field-mapping information, it is stored in memory 306, replacing the previous version of field-mapping information.

After processor 304 has identified the field-mapping information corresponding to the identified message identification code, a response message is created and provided to output device 308, shown as step 506. Processor 304 copies information fields from the message being responded to into the response message information fields as directed by the field-mapping information corresponding to the message identification code of the formatted message.

In step 508, the user enters information into any information fields that were not filled in automatically by processor 304. Some response messages may not need any user input, while other response messages may rely heavily on user input. Generally, the user will be able to alter certain information fields, as allowed by the field-mapping information. In this embodiment, the field-mapping information additionally comprises information relating to which information fields may be altered by the user.

After the user has entered information into the response message, the response message is provided to processor 304, where it is then transmitted to central station 102 in step 510. Of course, the entire response message is not transmitted. Processor 304 transmits a message identification code corresponding to the response message type, and each information field. Generally, some kind of formatting information is transmitted as well, such as an indication of stop/start bits between information fields, error correction coding, and so on.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

We claim:

1. A communication terminal, comprising:
   a receiver for receiving a formatted message out of a number of pre-defined formatted messages, comprising a message identification code and a plurality of information fields;
   an output device for presenting said formatted message to a user of said communication terminal;
   an input device for responding to said formatted message;
   a memory for storing said formatted message and for storing field-mapping information, said field-mapping information for indicating information to be copied from said formatted message to a response message based on which one of said pre-defined formatted messages was received;
   a processor for creating said response message in response to an indication from said input device of a request to respond to said formatted message, said response message comprising at least one response message information field, wherein information from at least one of said plurality of information fields of said formatted message is copied into at least one of said response message information fields based on said field-mapping information; and
   a transmitter for transmitting said information relating to said response message.

2. The communication terminal of claim 1, wherein said field-mapping information is configurable by a remote entity.

3. The communication terminal of claim 1, wherein said field-mapping information is transmitted to said communication terminal from a remote location.

4. The communication terminal of claim 1, wherein;
   said indication comprises identification information indicating which formatted message to respond to;
   said field-mapping information comprises a stored message identification code and field identification information; wherein
   said processor determines a message identification code corresponding to said selected formatted message, matches said determined message identification code to said stored message identification code, and inserts information from said selected formatted message into said response message as specified by said field identification information corresponding to said stored message identification code.

5. The communication terminal of claim 1, wherein said information from at least one of said plurality of information fields of said formatted message is alterable by a user of said communication terminal after it is copied into said response information field.

6. The communication terminal of claim 1, wherein said formatted message comprises two or more sub-messages, wherein said response message corresponds to a selected one of said two or more sub-messages.

7. A signal-bearing medium tangibly embodying a program of machine-readable instructions executable by a digital processing apparatus to perform operations for automatically entering information into formatted messages in a communication terminal, said operations comprising:
   receiving a formatted message, said formatted message comprising a message identification code and a plurality of information fields;
   presenting said formatted message to a user of said communication terminal;
   receiving an indication to send a response message to said formatted message;
   determining a message identification code of said formatted message to which said response message corresponds;
   identifying which information fields, from said plurality of information fields, to be copied into said response message, based on said message identification code;
   creating said response message using said identified information fields; and
   transmitting said response message.

8. The medium of claim 7, further comprising operations of creating said response message using said identified information fields and input from said user.

9. The medium of claim 7, wherein the operation of identifying which information fields to be copied into said response message comprises operations of:
   determining a message identification code corresponding to said formatted message;
   matching said message identification code corresponding to said formatted message to a stored message identification code;
   copying information contained within at least one of said plurality of information fields of said formatted message into said response message as identified by field-mapping information corresponding to said stored message identification code.

10. The medium of claim 7, wherein said information from at least one of said plurality of information fields of said formatted message is alterable by a user of said communication terminal after it is copied into said response information field.

11. The medium of claim 7, wherein said formatted message comprises two or more sub-messages, wherein said response message corresponds to a selected one of said two or more sub-messages.

12. A method for automatically entering information into formatted messages in a communication terminal, comprising:
   selecting a formatted message to respond to out of a number of pre-defined formatted messages;
   determining a message identification code of said formatted message;
   identifying one or more information fields of said formatted message to be copied into a response message based on field-mapping information stored in a memory, said field-mapping information for indicating information to be copied from said formatted message to a response message based on which one of said pre-defined formatted messages was received; and
   creating said response message, said response message comprising one or more response message information fields, wherein at least one of said response message information fields is filled in with information from one or more of said information fields of said formatted message based on said field-mapping information.

13. The method of claim 12, further comprising the step of:
   presenting said response message to a user of said communication terminal; and
   receiving information from said user in any of said response message information fields which have not been filled in.

14. The method of claim 13, wherein at least one of said response message information fields is alterable by said user.

15. The method of claim 12, wherein said formatted message comprises two or more sub-messages, wherein said response message corresponds to a selected one of said two or more sub-messages.

* * * * *